B. W. KADEL.
CAR TRUCK.
APPLICATION FILED JAN. 25, 1921.

1,414,955.

Patented May 2, 1922.

Witness
Edwin L. Bradford

Inventor
Byro W. Kadel
By
His Attorney

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,955.  Specification of Letters Patent.  Patented May 2, 1922.

Application filed January 25, 1921. Serial No. 439,795.

*To all whom it may concern:*

Be it known that I, BYERS W. KADEL, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to a flexible car truck of an improved type in which yielding means are provided for resisting longitudinal displacement of either of the truck side frames from normal position and for restoring said side frames to normal or square relation after a displacement thereof incident to the passage of the truck around curves or over imperfect rail joints or defective switch points.

The principal object of the invention, generally stated, is to produce a truck structure embodying easily maintained, simple, strong and efficient means for controlling the relative longitudinal movements of the truck side frames in the manner hereinbefore stated. The principal feature of the invention by which this object is accomplished consists in movably connecting the longitudinally displaceable side frames by a plurality of extensible yielding means extending across the truck, the said means being adapted to oppose yielding resistance to a relative movement of the side frames longitudinally of the truck and to restore said side frames to normal or square relation upon cessation of the force by which the out of square displacement of the side frames is induced.

There are other features of invention residing in elemental constructions and in combinations of elements, as will hereinafter appear.

In the drawings illustrating the preferred embodiment of my invention, the scope whereof is pointed out in the claims,—

Figure 1:
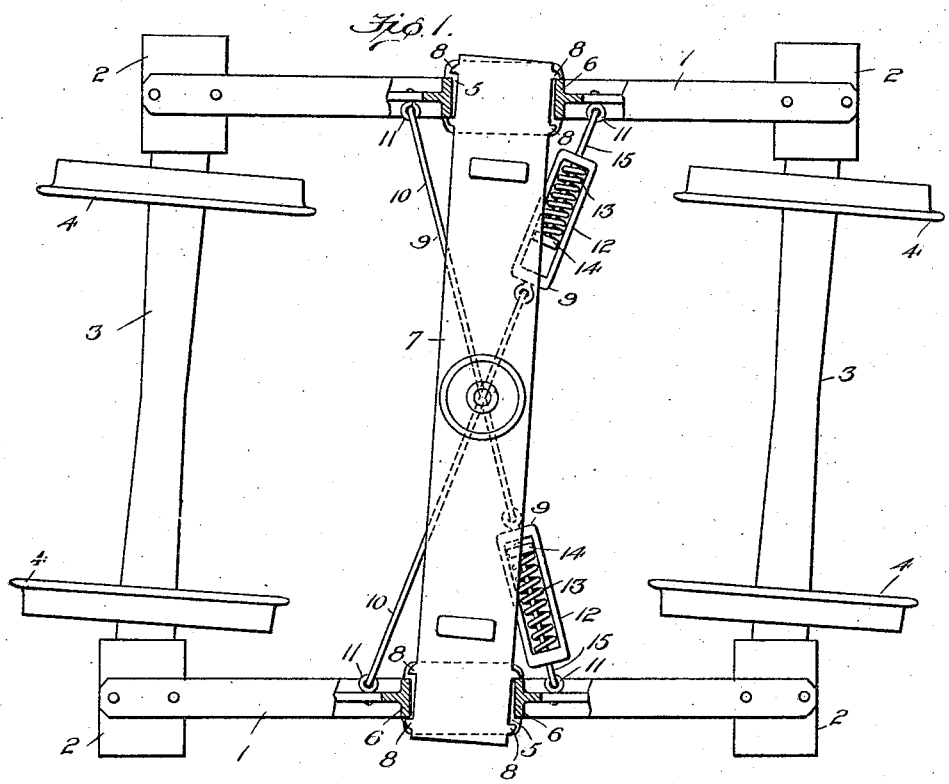
Figure 1 is a view, partly in plan and partly in horizontal section, of a car truck embodying the invention, the truck parts being illustrated in a position such as they assume when the truck is passing around a curve.
Figure 2:
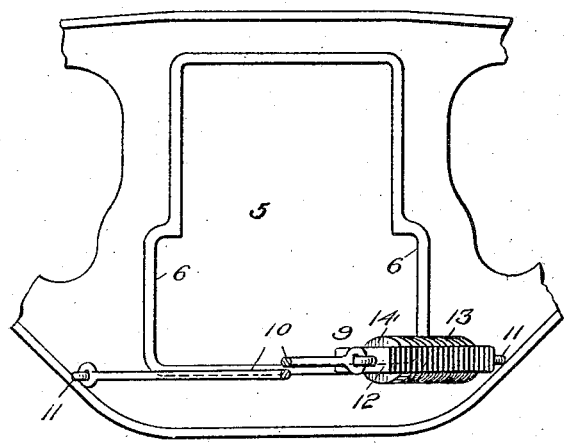
Figure 2 is a fragmentary elevation of the central portion of the inner side of one of the truck side frames showing the relation thereto of the truck squaring mechanism.

In the drawings, 1 indicates transversely spaced side frame members which are relatively movable longitudinally of the truck. Each side frame member is furnished at its opposite ends with journal boxes 2 receiving the journal ends of axles 3 upon which the truck wheels 4 are mounted.

Each side frame is provided midway between the journal boxes 2 with a bolster opening 5 formed between columns 6. The truck bolster 7, which is spring supported for vertical movement and whose opposite ends project into the bolster openings 5 in the usual manner, is preferably provided with lugs or guide blocks 8 adapted to cooperate with the truck columns 6, the side frames 1 thereby being connected transversely across the truck by the bolster. Sufficient clearance is provided between each pair of lugs 8 and also between the sides of the bolster 7 and the columns to allow said bolster to angle horizontally with respect to the side frames 1 without binding upon the columns thereof.

The yielding means for resisting relative longitudinal displacement of the side frame members 1 from normal position and for restoring said frame members to square relation, preferably consist of a plurality of yielding mechanisms 9 crossing each other diagonally below the bolster 7 and movably connected to each of the side frame members adjacent the lower ends of the bolster openings 5. These yielding means in effect form extensible tie rod devices movably connecting the side frames independent of the bolster.

Each of the yielding means 9 preferably comprises a rod or bar 10 which may conveniently be movably connected to one of the said frames by means of an eye 11. The opposite end of the rod 10 is connected to a yoke or frame 12 within and bearing upon one end of which is a spring 13. The opposite end of the spring 13 bears upon a plate or follower 14 slidably mounted between the arms of the yoke 12 and connected to the adjacent side frame member 1 by a rod or bar 15. The rod 15 may be movably connected to the adjacent side frame through an eye 11 carried by the latter. The springs 13 are preferably assembled under considerable initial compression so as to keep the tie rod devices 9 free of slack at all times.

When the side frame members 1 are displaced longitudinally of the truck from normal relation as occurs, for example, when the truck passes around a curve, the distance between the points of attachment 11 of one of the yielding devices 9 to the side frames is increased and the distance between the points of attachment of the other yielding mechanism 9 to the side frames decreases. This increase in the effective length of the tie device causes the spring 13 thereof to be compressed between the yoke 12 and the follower 14, such compression of the spring producing a pull upon the side frames resisting their displacement from normal relation. The decrease in length of the other tie device 9 is compensated for by the expansion of its spring 13. When the force which has caused the out of square displacement of the side frames 1 ceases to act the spring 13 which has been compressed thereupon expands and in so doing causes a relative movement of the side frames restoring them to normal position. During the movement of the side frames back to normal the parts of both tie members 9 reassume their normal relations. Each of the yielding tie rod mechanisms is preferably constructed so that it operates to resist longitudinal displacement of each side frame member 1 in only one direction.

I claim:—

1. In a car truck, the combination with spaced side frame members which are relatively movable longitudinally of the truck, of a bolster, and yielding means connecting said side frames below said bolster and transversely of the truck.

2. In a car truck, the combination with spaced oppositely disposed side frame members which are relatively movable longitudinally of the truck, of a plurality of extensible yielding means operable against and movably connecting said side frame members.

3. In a car truck, the combination with spaced oppositely disposed side frame members which are relatively movable longitudinally of the truck, of a bolster adapted to move vertically and to angle horizontally with respect to said side frame members, and yielding means independent of said bolster for connecting said frame members, said yielding means being transversely interposed between the side frame members.

4. In a car truck, the combination with oppositely disposed side frame members which are relatively movable longitudinally of the truck, of a bolster adapted to move vertically and to angle horizontally with respect to said side frame members, and a plurality of yielding means crossing each other diagonally between and movably connecting said side frame members.

5. In a car truck, the combination with side frame members which are relatively movable longitudinally of the truck and each of which is provided with a bolster opening, of a bolster extending into said bolster openings and adapted to move vertically and to angle horizontally with respect to said side frame members, and yielding means independent of said bolster connecting said side frame members adjacent the lower ends of said bolster openings.

6. In a truck, the combination with spaced oppositely disposed side frame members which are relatively movable longitudinally of the truck, of a bolster extending transversely of the truck and adapted to have relative vertical and relative pivotal movements with respect to said side frame members, and means involving a plurality of transversely arranged springs for operatively connecting said oppositely disposed side frame members, said means being adapted to resist relative longitudinal displacements of said side frame members from normal position.

7. In a car truck, the combination with spaced oppositely disposed side frame members which are relatively movable longitudinally of the truck, of a bolster adapted to move vertically and to angle horizontally with respect to said side frames, and tie rod devices movably connecting said side frame members, each of said tie rod devices including spring means adapted to permit said rod devices to change their lengths upon a relative longitudinal displacement of said oppositely disposed side frame members from normal position.

8. In a car truck, the combination with spaced side frame members which are relatively movable longitudinally of the truck and each of which is provided with a bolster opening, of a bolster extending into said openings and adapted to move vertically and to angle horizontally with respect to said side frame members, and a plurality of yielding diagonally arranged devices extending across said truck and adapted to apply force to said side frame members on opposite sides of the bolster openings thereof.

9. In a car truck, the combination with side frame members which are relatively movable longitudinally of the truck, of a yieldable member extending in an angular direction from one frame to the other.

10. In a car truck, the combination with oppositely disposed side frame members, which are relatively movable longitudinally of the truck, of a transverse yieldable member extending from and connecting one side frame member with the other.

In testimony whereof I affix my signature.

BYERS W. KADEL.